Figure 2A:
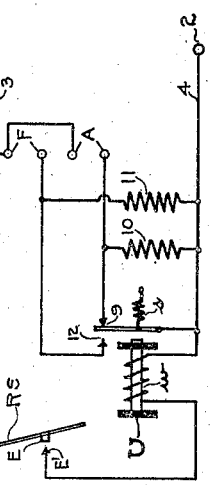

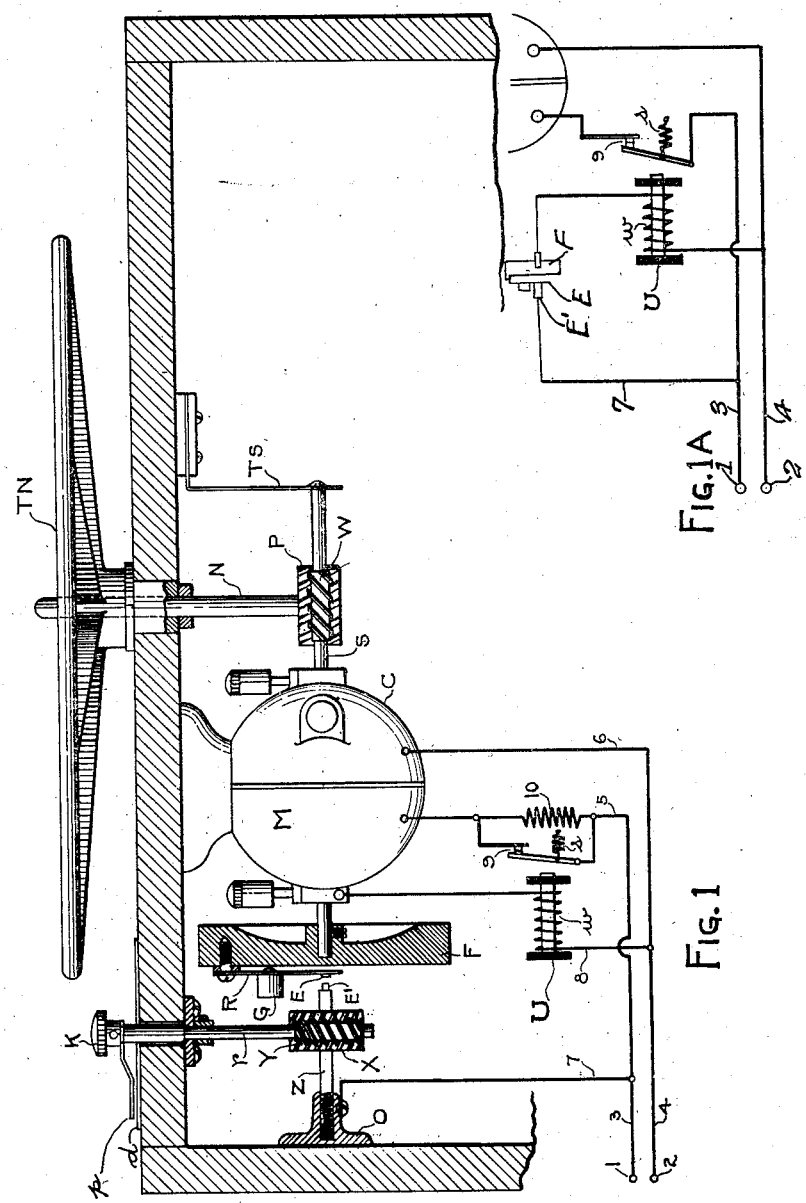

W. W. DEAN.
ELECTRIC GOVERNING SYSTEM.
APPLICATION FILED MAY 16, 1919.

1,419,233.

Patented June 13, 1922.
2 SHEETS—SHEET 2.

INVENTOR
W. W. DEAN.
BY
ATTORNEY

UNITED STATES PATENT OFFICE.

WILLIAM W. DEAN, OF WILMETTE, ILLINOIS, ASSIGNOR TO EFFICIENCY ELECTRIC CORPORATION, OF NEW YORK, N. Y., A CORPORATION OF NEW YORK.

ELECTRIC GOVERNING SYSTEM.

1,419,233.	Specification of Letters Patent.	Patented June 13, 1922.

Application filed May 16, 1919. Serial No. 297,621.

*To all whom it may concern:*

Be it known that I, WILLIAM W. DEAN, a citizen of the United States, residing at Wilmette, in the county of Cook and State of Illinois, have invented certain new and useful Improvements in Electric Governing Systems; and I do hereby declare the following to be a full, clear, concise, and exact description of the invention, such as will enable those skilled in the art to which it appertains to make and use the same.

My invention relates to electric governing systems, and more particularly to such an electric governing system as may be used in connection with electric motors required to be operated at a constant speed as, for instance, phonograph motors and the like, although I may employ the system of my invention in whole or in part wherever such a system or a portion of the same finds a use.

It has been previously proposed to control the speed of an electric motor used for driving the turn-table of a phonograph by including in circuit with the energizing circuit of the motor, whether it be of the direct current or alternating type, motor speed controlled contacts, the same being serially included in the said circuit and adapted whenever a certain speed is attained to interrupt the circuit of the motor.

I have found that although such motors will operate for a while, properly, that in time due to corrosion or wearing away of the contacts, on account of the electric arcing produced at the contacts when the same are broken, that the adjustment of these contacts is altered and that whereas in the first place a given speed of the motor would operate the contacts, that after such corrosion or wearing away, a different speed will produce the same effect of operating the contacts and, consequently trouble is had in maintaining a constant speed of the motor under the control of these governing contacts.

It has also been proposed to cause contacts of the normally open type to close, when a predetermined speed of the motor is reached a shunt circuit about the armature of the motor, but, due to the heavy currents traversing the governing contacts, they are corroded as in the first case and alter the speed of the motor shaft.

Efforts have been made to minimize this arcing at the contacts, and therefore the effect produced upon the contacts by the arcing, by shunting the motor speed controlled governing contacts by a non-inductive resistance. It has been found that although this is a considerable improvement, still the problem is not thereby completely solved, since if the resistance is made low enough to prevent the arcing at the contacts, the governing effect of the contacts is decreased to such an extent that the motor is not under a sufficient degree of control of the contacts to take care of all the varying conditions encountered in practice tending to change the speed of the motor, such as fluctuation of the voltage in the current supply circuit, a dirty condition of the motor commutators, etc.; also if the resistance is made high enough to allow the governing speed controlled contacts to exercise a sufficient degree of control over the motor to take care of the said varying conditions, some arcing at the contacts always ensues.

This is even more true, since it is of considerable value in the manufacture of electric motor phonographs to make the same motor operate from a direct current source of current supply or an alternating current source.

An object therefore of my present invention is to provide a governing system for the electric motor in which the speed controlled contacts do not carry a sufficient amount of current at any time to cause such corrosion of the contacts as is above described and which is above stated to be objectional, in that corrosion changes the adjustment of the contacts. I accomplish this by excluding these governing contacts from the energizing circuit of the motor but place them in a branch circuit of the source of current supply, and include in this branch circuit serially connected with the said speed controlled governing contacts, a relay winding of very high resistance. This relay has an armature capable of operating electrical contacts when the relay is operated, and I place these relay contacts in the circuit of the motor, preferably shunted by a resistance to minimize the arcing at the contacts, though these relay contacts are capable of use without any shunting resistance.

At first sight it would seem the trouble due to arcing was merely transferred from the speed controlled governing contacts to the relay contacts and that arcing at the relay contacts would produce the same effect as arcing at the speed controlled governing contacts of the former systems of the art before described, but that this is not so, will be understood when it is explained that whereas a slight difference in adjustment of the speed controlled contacts of the prior art would cause the motor to operate these contacts at a different speed than before and therefore to be regulated to such a different speed, in the system of my present invention the relay contacts might wear away or have any operative adjustment, and still they can only open when the relay is in one condition of operation and close when the relay is in the alternative condition of operation, and this is all the system of my present invention requires, not being dependent on the extent of the opening and closing.

I may make these relay contacts of such material as carbon or tungsten, or make up a contact set having one platinum contact and one tungsten contact. I have found in practice that the last-named combination works out exceedingly well.

Other objects of my invention are to provide certain improvements in details as will be more fully discussed hereinafter.

In the figures of the drawing I have shown diagrammatically, certain portions of a phonograph as is required to convey a full understanding of my invention to those skilled in the art.

Fig. 1 shows an embodiment of my invention comprising a phonograph electric motor governed in one way by the use of a high resistance relay and speed controlled governing electric contacts, the said speed controlled contacts being normally open, and being closed when the motor reaches a predetermined speed, the relay contacts being normally closed and normally shunted by a non-inductive resistance. A weighted governing reed spring is illustrated in Fig. 1.

In Fig. 1ᴬ an arrangement is illustrated wherein the relay contacts are unshunted.

Figure 2:
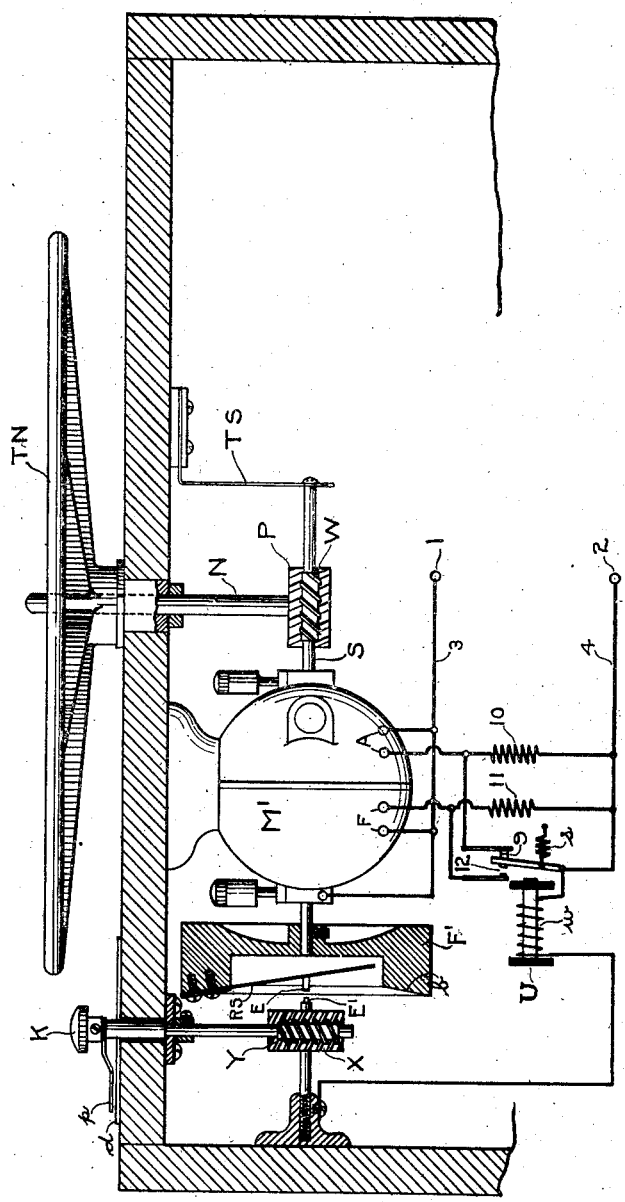

In Fig. 2, I show an unweighted reed spring rigidly secured to a point adjacent to the rim of the flywheel and normally extending at an angle to the plane of rotation of the flywheel. This is a preferred and novel form of governing reed spring, as is, in a co-pending application, fully pointed out and claimed. In Fig. 2, I show the control relay of my invention controlling two sets of contacts to exercise a more overpowering control upon the motor, than could be accomplished with a single set of contacts; one of the said contact sets controls the current flow through the motor armature, and the other set control the current flow through the field winding of the motor. This construction is for the purpose of taking care of violent surges in current strength or other sudden speed altering causes.

Fig. 2ᴬ shows a wiring diagram of the electrical system of Fig. 2, to make plainer how the various electrical circuits involved are controlled.

Referring to Fig. 1 of the drawings, at M, I show an electric motor, comprising a casing C, for the motor windings, armature, commutator, brushes, etc., a shaft shown at S, the said shaft carrying a flywheel F, at one end and being provided at the other end with a worm gear W, which meshes with a pinion P, to drive the same.

In the embodiment of my invention illustrated, the pinion P, is attached to a shaft N, carrying a turn-table TN. This turn-table may support a phonograph record as is well understood by those versed in the art, or by those familiar with phonographs through the use of the same.

Referring now particularly to Figures 1 and 1ᴬ, motor M, is of the series wound type, and may be constructed to operate either from an alternating or direct current source of supply. I find that it is more difficult to control the speed of a shunt-wound motor in the manner illustrated in Figs. 1 and 1ᴬ as the impedance effect of the shunt field winding of a shunt-wound motor will operate, when the motor is connected to an alternating current source, to cut down the flow of current through the field winding. If the winding is made of low enough impedance to allow sufficient current to flow on an alternating current system, too much current would flow when the same motor is connected to a direct current source. It is an object of this invention, therefore, to provide a motor system capable of operating with a single adjustment and without change on alternating current and direct current systems of approximately the same voltage and voltage range. The system illustrated in Figs. 2 and 2ᴬ is adapted to operate in connection with a shunt-wound motor, overcoming, to a considerable degree, the objections before noted, which are usually attendant to the use of this type of motor when operating interchangeably on alternating current or direct sources of power. Secured to the rim portion of the flywheel F, is a reed spring R, carrying at an intermediate point, an electrical contact E. This contact E and the reed spring R carrying it, might be arranged in any suitable way but I prefer it as illustrated in Fig. 1, or in Fig. 2, in which figures this contact is arranged in line with the axis of the shaft S, so that the contact surfaces of the contact E and the cooperating rigidly supported contact E' are kept clean by the rotation of the contact E, when the motor is operated and the two contacts are intermittently made. At the same time, however, this arrangement does not produce undue wearing away of the contact surfaces on account of the fact that no part of the surfaces of these contacts are very far away from the true axis of rotation, and also due to the fact that the pressure between the contacts is extremely light, since, as I only convey infinitesimal currents through these contacts due to the high resistance relay winding included in circuit therewith, but a very light contact pressure is required in order to enable sufficient current to traverse the contacts to operate the relay whose winding is included in circuit therewith and which relay winding is shown in the various figures of the drawing at w.

An external adjusting knob K, is provided having a pointer p, which registers with a scale disc d, in order that the operator may adjust the rigidly supported contact E' according to the speed of rotation desired. The knob K, is for the purpose secured to a rod r, which carries at its lower extremity a worm Y. This worm engages a pinion X, on the first contact carrying rod Z, which is rotatably secured in a member O, this being accomplished by an internal thread on the member O, and a cooperating external thread on the rod Z, producing the effect when the pinion X is operated by the worm Y, of longitudinally displacing the rod Z, and therefore the supported fixed governing contact E', to alter the adjustment of the said contact.

In passing it may be explained that the rotation of the turn-table TN, is accomplished through the worm and pinion W—P, the ratio being usually about 15 to 1 that is, for one rotation of the turn-table TN, the motor shaft will rotate 15 times; thus for a motor of 1170 R. P. M. the turn-table will rotate at 78 R. P. M. which is a common speed used in the operation of phonograph turntables.

Secured to the free portion of the reed spring R, is a weight G, arranged with its center of mass on that side of the spring away from the flywheel F, so that when the said flywheel is rotated by the motor, the weight G, due to its mass and inertia will carry the free portion of the reed spring R, away from the flywheel to a degree determined by the speed of the motor, and it can easily be seen that by suitably proportioning the reed spring R, the carried weight G, and by properly proportioning the normal air gap between the fixed contact E' and the carried reed spring contact E, that the contacts E—E' may be made to close at any predetermined speed.

At 1 and 2, I show the incoming terminals of a source of current supply, such as an electric lighting circuit, also circuit conductors 3 and 4 carrying the source of current supply to the motor circuit conductors 5 and 6 and to the governing circuit conductors 7 and 8; the motor circuit conductors and governing circuit conductors being each connected separately in a bridge of the current supply conductors. Serially included in the circuit of the motor circuit conductor 5, are controlling relay contacts 9, and a relay contact shunting resistance 10. Serially included in the governing circuit conductors 7 and 8, are the normally open speed controlled governing contacts E—E', and the high resistance winding w of the relay U, the arrangement being such that the serially included contacts E—E' are closed at a predetermined speed of the motor such, being slightly above 1170 R. P. M., whereupon the serially included relay winding w is energized from the source of current supply to operate the relay U, and cause the interrupting of the relay contacts 9.

In this connection it should be understood that the best effects are produced by making the relay U of the fast operating type, so that the operation of the contacts 9 is practically simultaneous with the operation of the governing control contacts E—E'. Therefore, I use for this purpose a relay having a very light armature normally retracted under the influence of a relatively powerful spring s, and the adjustment of the armature being such that at no time can it come in contact with the relay magnet pole. Also the magnetic circuit is preferably constructed of laminated silicon steel stampings. There must be no appreciable lagging in operation by the armature after the operation of the speed controlled contacts E—E', hence a so-called fast relay should be used to secure the best results.

The operation of the embodiment of my invention illustrated in Fig. 1 will now be easily understood. At a predetermined speed of the motor, the contacts E—E' being thereupon closed, the relay U is operated, the contacts 9 are broken, and the resistance 10 is included in the energizing circuit of the motor M, and its speed immediately falls to a point where the contacts E—E' are again broken. At this time the relay U, is deenergized, and its armature being fast operating, the contacts 9 are again immediately closed, reestablishing the shunt about the resistance 10, and causing the motor to speed up again due to an increase in current over its energizing circuit. This action is continuous, there being frequent cycles of speed retardation and speed acceleration at all times within very narrow limits, producing the desired effect of maintaining a very constant motor and therefore a very constant turn-table speed.

Referring to Fig. 1ᴬ, I show a modification of the system of Fig. 1 wherein the relay U, having a winding w, contacts 9, a retractile spring s as provided as described in Fig. 1, but whose contacts 9 are unshunted by the resistance coil, such as is shown at 10 in Fig. 1. More arcing at the contacts 9 is had than in the system of Fig. 1, but outside of the depreciation of the contacts this produces no deleterious effect and the regulation speed of the motor is maintained independent of such depreciation, and due to the resistance coil 10 being entirely eliminated when the contacts 9 of Fig. 1ᴬ are operated, the circuit of the motor is entirely opened and a more powerful retarding control exercised over the motor than in the system of Fig. 1.

Referring to Fig. 2 in which like parts have the same reference characters as corresponding parts of Fig. 1, at F, I show a flywheel having a beveled edge b, adjacent to the rim of the flywheel, and secured to this beveled edge I mount an unweighted reed spring RS, carrying a contact E, which is mounted as in Fig. 1, in line with the axis of rotation of the motor shaft S, but in this figure the reed spring RS normally extends at an angle to the plane of rotation of the flywheel or, expressed in other words, normally extends at an angle different than a 90 degree angle to the motor shaft.

The reed spring RS has preferably its carried contact E mounted at an intermediate portion of the spring, the free extremity extending for a considerable distance beyond the contact E from its point of support. I find that a reed spring of this construction and mounted as illustrated in Fig. 2, as before described, has the best operating characteristics of any form of centrifugal speed operated contact carrying device of which I am aware. I find in practice that a given speed will invariably produce an exactness of operative result not obtainable by any other form of device for the purpose hitherto proposed.

Due to its lightness and lack of a weighted portion, it responds very quickly to speed changes without a noticeable "over-throw" which is quite troublesome in the case of certain forms of weighted reed springs with which I am familiar and which cause quite noticeable speed pulsations.

Such speed pulsations while not particularly detrimental in connection with some forms of electric motor propelled devices, are particularly objectionable in connection with phonograph motors which are required to operate without such pulsations in order to produce the best phonographic tone result.

I am claiming the mechanical construction of this particular form of unweighted reed spring governor in another application, Serial No. 297,624, filed May 16, 1919, the claims of this application being limited to the system in which it is by preference employed.

The circuits employed in Fig. 2, will now be described, reference also being possible at the same time to the schematic diagram thereof illustrated in Fig. 2ᴬ, like parts of each having like reference characters.

The relay winding w and the speed controlled governing contacts E—E' are included in a bridge of the current supply circuit terminals 1 and 2, in the same manner as that described in the system of Fig. 1, and the relay U is operated at such times and under such conditions as described in connection with the system of Fig. 1. The contacts 9 of the relay U operate in accordance with the description of the like contacts 9 of Fig. 1; the shunting resistance 10, having the same purpose and operating the same way as described for Fig. 1.

In addition to contacts 9, I show in Fig. 2 an extra set of normally open contacts 12, and which are adapted to be closed whenever the relay U is operated to shunt a resistance 11, normally included in circuit with the field winding of the motor M', which motor is in Fig. 2 a shunt wound motor, whereas in Fig. 1 the motor may be either of the series or shunt wound type. This shunt of the serially included resistance 11 which normally is in circuit with the motor field winding produces the effect of allowing more current to flow through the field winding, whereupon as will be well understood by those familiar with the characteristics of shunt wound motors, the motor speed will be retarded and this retardation added to the retardation accomplished by the opening of the contacts 9, serially including the resistance coil 10 in circuit with the armature of the motor, produces a more powerful effect than is produced by the contacts 9 operating alone, as, for instance, illustrated in Fig. 1. The terminals A of the motor are connected to the armature thereof, and the terminals F are connected to the field winding of the motor. The function of the resistance coils 10 and 11 in Fig. 1 and Fig. 2, is to reduce the arcing at the relay contacts.

In this application I do not claim broadly the subject-matter of Figs. 1 and 1ᴬ but claim the same in a co-pending application, Serial No. 504,955, filed October 3, 1921, which is a division hereof.

I am aware that numerous and extensive departures may be made from the embodiment of my invention herein illustrated and described without departing from the spirit of the invention, but what I claim is my invention is defined in the following claims:—

1. In combination with an electric motor adapted to be operated on either direct or alternating current sources having substantially equal potential and voltage limits, of a field winding for the said motor, an armature winding therefor, a governor for the said motor comprising a set of electric contacts adapted to be operated responsive to a predetermined motor speed, a relay under the control of said contacts and a set of relay contacts controlling the supply of current to the said armature winding, a separate set of relay contacts controlling the supply of current to the field winding, one of the said contact sets comprising normally closed, and the other set of relay contacts comprising normally open relay contacts.

2. In combination with an electric motor adapted to be operated on either direct or alternating current sources having substantially equal potential and voltage limits, of a field winding for the said motor, an armature winding therefor, a governor for the said motor comprising a set of electric contacts adapted to be operated responsive to a predetermined motor speed, a relay under the control of said contacts and a set of relay contacts controlling the supply of current to the said armature winding, a separate set of relay contacts controlling the supply of current to the field winding, one of the said contact sets comprising normally closed, and the other set of relay contacts comprising normally open relay contacts, and a resistance shunt for each contact set normally connected around its associated contact set.

3. In combination, an electric motor, field and armature windings for the said motor, said windings being of relatively low impedance, an energizing circuit, said windings being bridged across said circuit, a switch controlling the flow of current from the said circuit to each of the said windings, and means responsive to the motor speed for operating the said switch.

4. In combination, an electric motor, field and armature windings for the said motor, an energizing circuit, switch contacts for controlling the flow of current through the said armature winding to diminish the same when a predetermined motor speed is exceeded, switch contacts controlling the flow of current through the said field winding to increase the said current flow when a predetermined motor speed is exceeded and common controlling means responsive to the speed of the motor for controlling the operation of the said contacts.

5. In combination, an electric motor, field and armature windings for the said motor, an energizing circuit, switch contacts for controlling the flow of current through the said armature winding to diminish the same when a predetermined motor speed is exceeded, switch contacts controlling the flow of current through the said field winding to increase the said current flow when a predetermined motor speed is exceeded, and common controlling means responsive to the speed of the motor for controlling the operation of the said contacts, said common controlling means comprising speed responsive contacts, an electromagnet controlling the said switch contacts, and an energizing circuit including a winding of the said magnet and the said speed responsive contacts.

6. In combination, an electric motor, field and armature windings for the said motor, an energizing circuit, switch contacts for controlling the flow of current through the said armature winding to diminish the same when a predetermined motor speed is exceeded, switch contacts controlling the flow of current through the said field winding to increase the said current flow when a predetermined motor speed is exceeded and common controlling means responsive to the speed of the motor for controlling the operation of the said contacts, said first named switch contacts and said last named switch contacts being adapted to be operated in the order mentioned upon increasing motor speeds.

7. In combination, an electric motor, field and armature windings for the said motor, an energizing circuit, switch contacts for controlling the flow of current through the said armature winding to diminish the same when a predetermined motor speed is exceeded, switch contacts controlling the flow of current through the said field winding to increase the said current flow when a predetermined motor speed is exceeded and common controlling means responsive to the speed of the motor for controlling the operation of the said contacts, said common controlling means comprising speed responsive contacts, an electromagnet controlling the said switch contacts, and an energizing circuit including a winding of the said magnet and the said speed responsive contacts, said first named switch contacts and said last named switch contacts being adapted to be operated in the order mentioned upon increasing motor speeds.

In witness whereof, I hereunto subscribe my name this 14th day of May, A. D. 1919.

WILLIAM W. DEAN.